Nov. 22, 1938.　　　K. A. BROWNE　　　2,137,384

FUEL METERING AND DISTRIBUTING SYSTEM

Filed Dec. 14, 1934　　　3 Sheets-Sheet 1

INVENTOR
KENNETH A. BROWNE
BY
ATTORNEY

Nov. 22, 1938.　　　K. A. BROWNE　　　2,137,384
FUEL METERING AND DISTRIBUTING SYSTEM
Filed Dec. 14, 1934　　　3 Sheets-Sheet 2

INVENTOR
KENNETH A. BROWNE
BY
ATTORNEY

Nov. 22, 1938.  K. A. BROWNE  2,137,384

FUEL METERING AND DISTRIBUTING SYSTEM

Filed Dec. 14, 1934 3 Sheets-Sheet 3

INVENTOR
KENNETH A. BROWNE
BY
ATTORNEY

Patented Nov. 22, 1938

2,137,384

UNITED STATES PATENT OFFICE 2,137,384

FUEL METERING AND DISTRIBUTING SYSTEM

Kenneth Alan Browne, Paterson, N. J., assignor to Wright Aeronautical Corporation, a corporation of New York Application December 14, 1934, Serial No. 757,462

4 Claims. (Cl. 221—95)

The present invention relates generally to improvements in fluid distribution systems, and has particular reference to a system adapted to deliver metered quantities of motor fuel to an internal combustion engine.

One of the primary objects of the present invention is to provide a new and improved distribution system having a distributor adapted to deliver metered quantities of fluid in timed sequence to an odd number of engine cylinders.

Another object resides in the provision of a distributor which is inexpensive to manufacture, and which is substantially free from any damaging effect of dirt or other solid foreign matter likely to be present in the fluid.

Further objects and advantages will become apparent as the description proceeds.

In the accompanying drawings.

Figure 2:
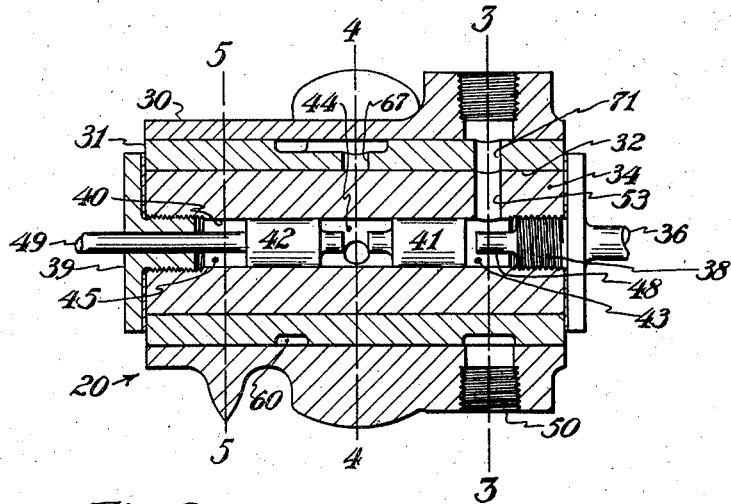
Fig. 2 is an axial sectional view of a rotary distributor forming part of the system.
Figure 3:
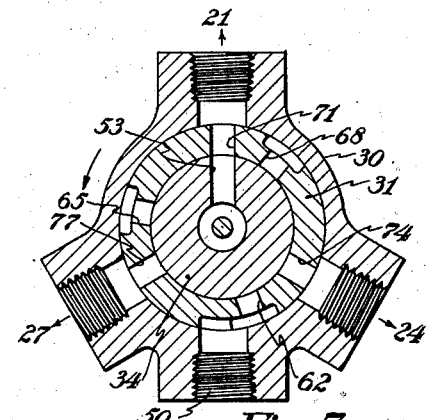
Figure 4:
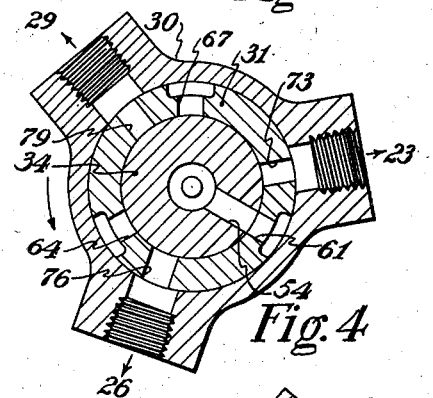
Figure 5:
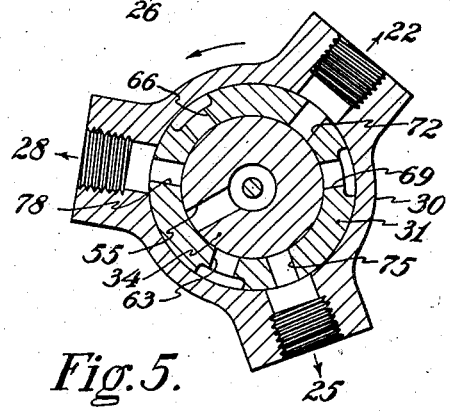
Figure 6:
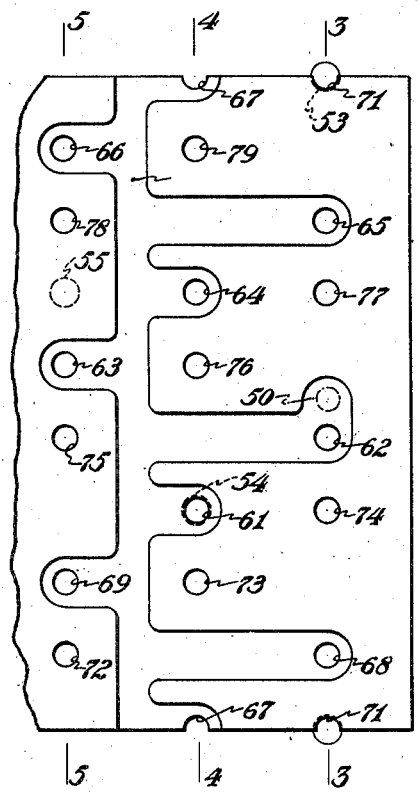
Figure 7:
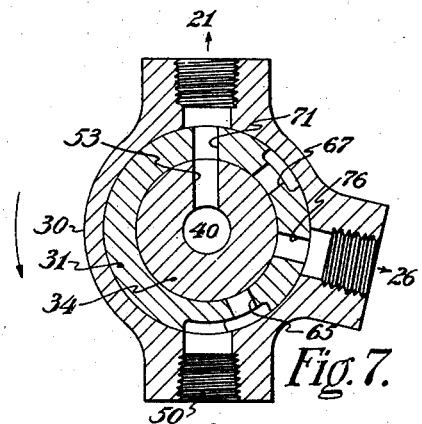
Figure 8:
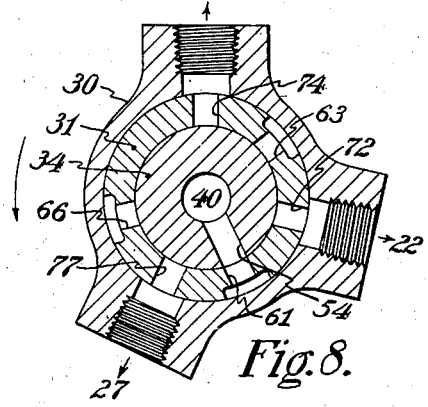
Figure 9:
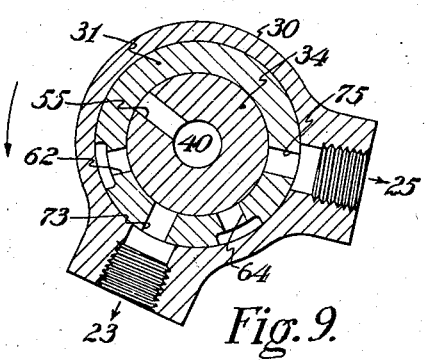
Figure 10:
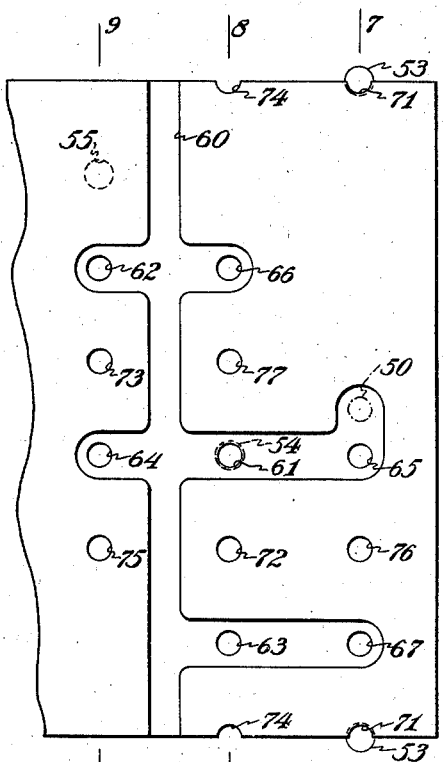

Figs. 3 to 5, inclusive, are transverse sectional views of the distributor for a nine cylinder engine taken respectively along lines 3—3 to 5—5 of Fig. 2;

Fig. 6 is a plan development of the distributor liner for a nine cylinder engine;

Figs. 7, 8 and 9 are transverse sectional views of a distributor for a seven cylinder engine taken on the lines 7—7, 8—8 and 9—9 respectively of Fig. 10, being analogous to Figs. 3-5; and Fig. 10 is a plan development of the distributor liner for a seven cylinder engine.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Figure 1:
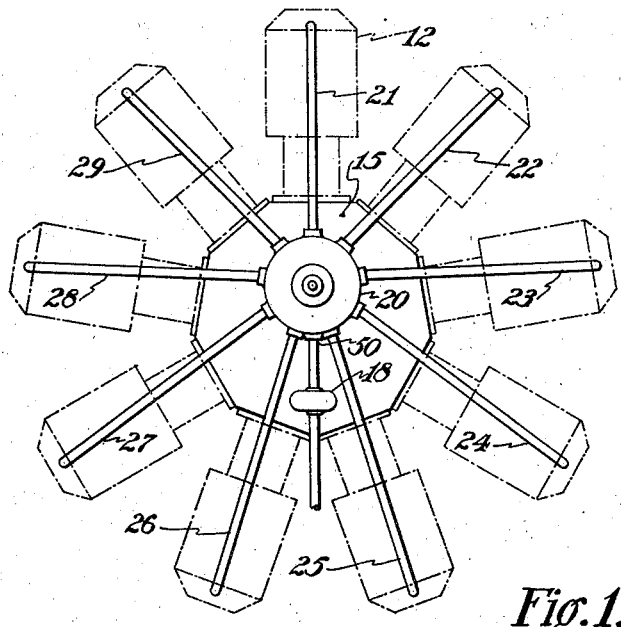
Fig. 1 is a diagrammatic end view of an internal combustion engine to which a fluid distribution system embodying the features of my invention has been applied.

For purposes of illustration, the distribution system is herein disclosed as a means for injecting metered and timed charges of motor fuel into a radial internal combustion engine operating on the four stroke cycle. It will be understood that the system is not limited to any particular type of internal combustion engine and that the fuel charges may be introduced at any suitable point, for example into the manifold or the intake passages or directly into the cylinders. In the present instance, the engine (Fig. 1) is of the aircraft type, and comprises a central crankcase 15 and nine uniformly spaced radial cylinders 12.

The fuel injection system comprises a distributor 20 adapted to receive liquid motor fuel under pressure from a suitable pump 18, and a plurality of delivery conduits 21 to 29 opening directly to the engine cylinders 12 from the distributor. Any suitable means (not shown) may be provided for supplying air for combustion to the cylinders.

In its preferred form, the distributor 20 comprises a generally cylindrical casing 30 (Fig. 2) having a sleeve liner 31 fitted tightly into it, and through the sleeve 31 is an axial bore 32. A rotor 34 is rotatably mounted in the bore 32, and at its engine end has a shaft extension 36, adapted to be connected by suitable gearing to the engine crankshaft. Hence, the rotor 34 is driven in timed relation to the power strokes of the engine pistons (not shown), at one-half engine speed for the case cited.

Through the rotor 34 is an axial bore 40 closed at each end by screwed-in plugs 38 and 39, and constituting a metering chamber.

Slidably mounted in the bore 40 for reciprocation, either together as a unit or independently, are two displacement or metering plungers 41 and 42. The adjacent ends of the plungers 41 and 42 are provided with reduced diameter stems which may at times abut. By reason of the reduced stems, an intermediate fuel chamber 44 is provided between the plungers 41 and 42. The plungers 41 and 42 coact with the bore 40 to define opposite end fuel chambers 43 and 45. The control stop 49, which is slidably located in an axial hole in the plug 39, may be engaged by the plunger 42. The opposed stop 48, adapted for engagement by the plunger 41, is fixed in position and may be integral with the plug 38.

The plungers 41 and 42 are adapted to be operated singly or jointly by the pressure of the fuel. Thus, assuming that the plungers are in engagement with each other and with the stop 49, fuel under pressure supplied to the chamber 44, will move the plunger 41 into engagement with the stop 48, thus charging the chamber 44 and discharging the chamber 43. Subsequently, fuel under pressure supplied to the chamber 45 moves the plunger 42 into engagement with the plunger 41 thereby charging the chamber 45 and expelling the fuel from the chamber 44 which was charged on the previous stroke. If fuel under pressure is now supplied to the chamber 43, both plungers 43, 44 move as a unit against the stop 49, thus expelling fuel from the chamber 45 while charging the chamber 43 and returning the plungers to the starting position. Thus, three charges have been expelled to three consecutively firing cylinders. The action repeats three times for charging a nine-cylinder engine.

Limitation of the length of the plunger stroke constitutes the method employed for metering the quantity of fuel expelled in each charge. The extent of reciprocation is determined by the position of the movable control stop 49. If the stop 49 is adjusted inwardly until the plungers 41 and 42 are held in without reciprocating clearance against the stop 48, no fuel will be delivered. The range of reciprocation is the same for each plunger moving separately as for both plungers moving simultaneously. The stop 49 may be adjusted or controlled by any suitable means (not shown), and in the operation of the engine may be adjusted in accordance with the supply of air to the cylinders so as to obtain a predetermined fuel-air mixture.

The liner 31 and the rotor 34 constitute valve means for directing fuel to and from the bore 40. It will be understood that the valve means may be constructed to adapt the distributor for different odd numbers of discharges during each complete revolution of the rotor 34. To obtain an odd number of discharges, other than nine, the sequence of plunger motion described is performed once, thus securing three discharges to which are added pairs of discharges produced by repeated reciprocations and consecutive return of a single plunger, the total discharges in a single revolution of the rotor, therefore, being the sum of three, and groups of two making an odd quantity. In the showing of Figs. 7 to 10, the valve means of the distributor 20 is adapted to produce seven consecutive metered discharges during one complete revolution of the rotor 34. The engine with seven cylinders is not shown.

The nine cylinder valve means (Figs. 3 to 6) comprises sets of three inlet ports 61 to 69 in three longitudinally spaced transverse planes, (Figs. 3 to 5) opening from the bore 32 of the liner 31 to a labyrinth fuel duct 60 formed in the outer surface of the liner, which communicates with the source of fuel pressure, the pump 18 through a hole 50. The ports of each set are uniformly spaced about the periphery, i. e. 120° apart, and the ports of the different sets are uniformly staggered consecutively about the periphery, i. e., 40° apart. Opening to the interior of the bore 40 for communication respectively with the three rows of liner ports are three rotor ports 53, 54 and 55, (Figs. 3 to 5) spaced uniformly about the periphery of the rotor 34. It will be evident that the fuel supply will be connected successively to the chambers 44, 45 and 43 through the selective inlet ports by the rotor ports 54, 55 and 53, in order identified, as the rotor is turned in the direction indicated.

Also opening from the bore of the casing 36 in the same planes with the inlet ports are three sets of three discharge ports 71 to 79 (Figs. 3 to 5), which communicate with the delivery conduits 21 to 29. The outlet ports are staggered consecutively about the periphery in the same manner as the inlet ports, i. e., 40° apart on the periphery of the rotor. It is obvious that the rotor ports 53, 54 and 55, also index with the discharge ports just 40° after indexing with the preceding inlet port, thus providing outlet passage for the fuel which was charged in the rotor when the inlet port was previously in communication with the bore 40.

For the sake of simplicity in piping the distributor is arranged to discharge in the same order of members as the conventional firing order of the engine, but it will be understood that by varying the relative positions of the rotor ports 53 to 55, the discharge order of the distributor may be arranged for most any desired firing sequence.

All of the ports preferably consist of drilled holes, thereby resulting in a low cost of manufacture, and in substantial avoidance of injury to the bearing surfaces by dirt or other solid foreign matter that may be present in the fuel.

The present arrangement will be clearly understood from the following description of the operation of the nine cylinder distributor. Assuming that the rotor 34 is turning in a counter-clockwise direction, as viewed in Figs. 1, 3, 4 and 5, and that the stop 49 is adjusted outwardly to permit a predetermined range of plunger movements, and that the plungers 41 and 42 are in engagement and located against the stop 49, initially the rotor port 54 is moved into communication with the inlet port 61 (Fig. 4) and simultaneously the rotor port 53 is moved into registry with the discharge port 71 (Fig. 3). As a result, the chamber 44 is charged with fuel under pressure which moves the plunger 41 away from the plunger 42 and against the stop 48 to expel a metered quantity of fuel from the chamber 43 to the conduit 21. Next, the rotor ports 55 and 54 are moved respectively into communication with the inlet port 63 and the discharge port 73 to charge the chamber 45, and thereby to effect movement of the plunger 42 into engagement with the plunger 41 to expel a metered quantity of fuel from the chamber 44 to the conduit 23. Thereafter, the rotor ports 53 and 55 are moved respectively into registry with the inlet port 65 and the discharge port 75. As a result, the chamber 43 is charged with fuel, and the two plungers 41 and 43 are moved jointly into position against the stop 49 to expel a metered quantity of fuel from the chamber 45 to the conduit 25. As the rotation of the rotor 34 continues, the foregoing cycle of plunger movements is twice repeated. The whole succession of port registries and corresponding chamber chargings and emptyings is as follows:

| Inlet registry | Charging chamber | Outlet registry | Emptying chamber | Feeding cylinder |
| --- | --- | --- | --- | --- |
| 54—61 | 44 | 53—71 | 43 | 21 |
| 55—63 | 45 | 54—73 | 44 | 23 |
| 53—65 | 43 | 55—75 | 45 | 25 |
| 54—67 | 44 | 53—77 | 43 | 27 |
| 55—69 | 45 | 54—79 | 44 | 29 |
| 53—62 | 43 | 55—72 | 45 | 22 |
| 54—64 | 44 | 53—74 | 43 | 24 |
| 55—66 | 45 | 54—76 | 44 | 26 |
| 53—68 | 43 | 55—78 | 45 | 28 |

Thus, the fuel is fed to alternate cylinders to give a conventional firing order of 1—3—5—7—9—2—4—6—8.

The arrangement for distributing fuel to seven cylinders will be clearly understood from the following description: The Figs. 7, 8 and 9, represent transverse sections at 3—3, 4—4 and 5—5 (Fig. 2) respectively, of a distributor 20 organized for seven cylinders. The rotor ports 53, 54, 55, the inlet ports 61 to 67 and discharge ports 71 to 77 are located unsymmetrically but always on axes one-seventh of a revolution apart and in the respective positions shown. Assuming counter-clockwise rotation, the inlet ports 61 to 67 consecutively engage the rotor ports in the order 54, 55, 54, 55, 53, 54, 53, thus charging in order the chambers 44, 45, 44, 45, 43, 44, 43, while simultaneously the discharge ports 71 to 77 consecutively index with the rotor ports in the order 53, 54, 55, 54, 55, 53, 54, thus discharging the metered quantity from the chambers in the order 43, 44, 45, 44, 45, 43, 44, and causing plunger 41 to move to stop 48, plunger 42 to move to plunger 41, plunger 42 to return to stop 49, plunger 42 to return to plunger 41 again, both plungers together to move to stop 49, plunger 41 to move to stop 48, and plunger 41 to return to plunger 42 respectively in order thus completing seven discharges in one revolution. Expressing the sequences of port registry in another way, in the position shown, for delivery of fuel to cylinder #21, the rotor port 53 registers with the outlet port 71 while the rotor port 54 registers with the inlet port 61. The whole sequence for one rotation is as follows:

| Inlet registry | Charging chamber | Outlet registry | Emptying chamber | Feeding cylinder |
|---|---|---|---|---|
| 54—61 | 44 | 53—71 | 43 | 21 |
| 55—62 | 45 | 54—72 | 44 | 22 |
| 54—63 | 44 | 55—73 | 45 | 23 |
| 55—64 | 45 | 54—74 | 44 | 24 |
| 53—65 | 43 | 55—65 | 45 | 25 |
| 54—66 | 44 | 53—76 | 43 | 26 |
| 53—67 | 43 | 54—77 | 44 | 27 |

The firing order resulting from the above is consecutive, but the port positions and cylinder connections may obviously be changed to produce any desired firing order.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination a metering device and distributor having, in combination, a casing, a rotor in said casing having an axial chamber, two metering plungers mounted in said chamber for independent reciprocation to form fluid spaces between or at the ends of said plungers, inlet means adapted to supply fluid under pressure to said casing, a plurality of independent fluid discharge means opening from said casing, means formed in said rotor and coacting with said inlet means to introduce fluid under pressure into said chamber to effect a timed series of plunger movements by which said spaces are formed, and means formed in said rotor and coacting with said discharge means for directing metered charges of fluid displaced by said plungers from a collapsing space successively to said respective discharge means.

2. In combination, a metering device and distributor comprising, in combination, a casing having an axial bore, a rotor in said bore and having an axial metering chamber, two spaced stops in opposite ends of said chamber, one of said stops being adjustable axially of said chamber, two metering plungers mounted in said chamber for reciprocation between said stops, said plungers dividing said chamber into an intermediate and opposite end spaces, pressure fluid supply means, a plurality of sets of discharge passages associated respectively with said spaces, and a plurality of longitudinally spaced sets of coacting ports formed in said casing and rotor for said respective spaces, each set of ports serving to connect the associated space alternately to said supply means and to successive discharge passages, said sets of ports being staggered in angular phase relation to effect a predetermined sequence of plunger movements.

3. In combination, a metering device and distributor comprising a casing, a rotor in said casing having a longitudinal metering chamber, a pair of metering plungers mounted in said chamber for reciprocation, said plungers dividing said chamber into intermediate and end spaces, said spaces being expansible and collapsible due to plunger movements, and means operable in the rotation of the rotor for simultaneously charging and exhausting the respective collapsed and expanded spaces between said plungers in a sequence of varying combinations of spaces to effect a predetermined sequence of plunger movements, said movements including a periodic separation of said plungers.

4. In combination, a rotary liquid distributing valve having a bore and a metering device therein, said valve having axially spaced ports for the entry and egress of liquid to and from said bore, said device comprising a plurality of axially movable floating plungers fitted in said bore and reciprocable under the influence of port opening and liquid feed to provide a plurality of separate liquid-containing spaces within said bore.

KENNETH ALAN BROWNE.